UNITED STATES PATENT OFFICE.

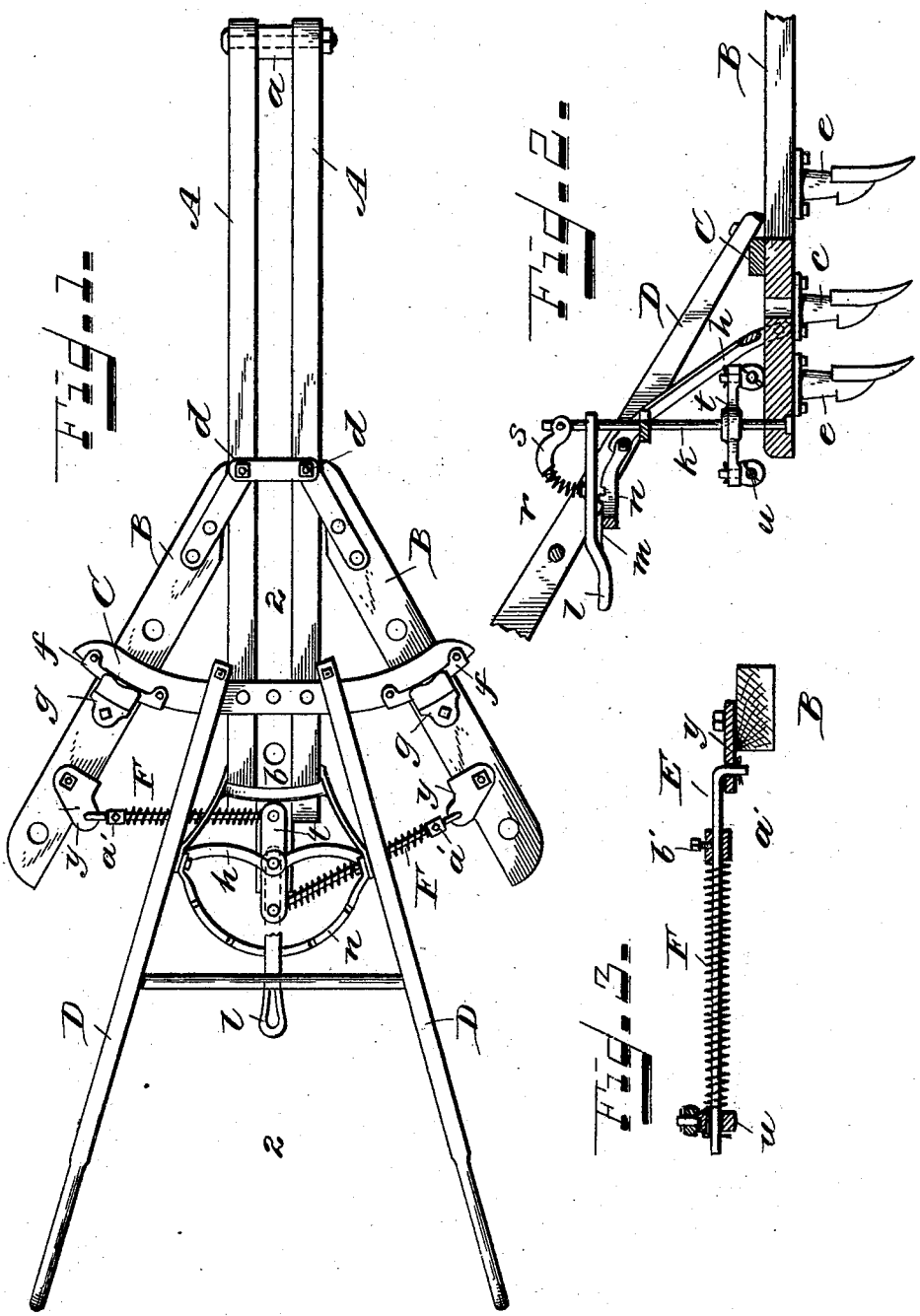

HENRY C. HAM, OF LIBERTY, INDIANA, ASSIGNOR TO THE RUDE BROTHERS MANUFACTURING COMPANY, OF SAME PLACE.

GRAIN-DRILL.

SPECIFICATION forming part of Letters Patent No. 553,405, dated January 21, 1896.

Application filed October 7, 1895. Serial No. 564,938. (No model.)

*To all whom it may concern:*

Be it known that I, HENRY C. HAM, a citizen of the United States, residing at Liberty, in the county of Union and State of Indiana, have invented certain new and useful Improvements in Grain-Drills, of which the following is a full, clear, and exact description, reference being had to the accompanying drawings, forming part of this specification.

My improvement relates more particularly to that class of agricultural implements known as "walking grain-drills," in which the side beams are adjustable to suit the conditions of the rows; and my improvements consist of means for adjusting the side beams or wings and holding them in adjustment under spring-pressure so applied that each of the side wings may shift laterally independently of the main beam and of each other and so that the spring-pressure can be regulated as desired.

In the drawings, Figure 1 is a top plan view of the framework of the grain-drill, showing my invention, the seed-hopper and feeding devices being removed. Fig. 2 is a sectional side elevation of the same, taken on lines 2 2 of Fig. 1. Fig. 3 is a detailed view, partly in section, showing the connection between the side wings and the operating-lever.

The framework of the machine is made up of two longitudinal parallel bars A A, with block $a$ at one end, to which the horse is hitched, and an intermediate bar $b$ at the other end, to which the central hoe $c$ of the drill is secured.

B B are the side beams or wings pivoted to the main beam at $d$ $d$, so that they can be adjusted laterally. To these side wings the side hoes $e$ $e$ are secured.

C is a cross-bar bolted to the main frame and provided with bearing-plates $f f$ at each end, while $g$ $g$ are guide-plates secured to the side wings and with shoulders extending over the cross-bar to allow the side wings to be adjusted laterally, but to prevent any vertical play.

The carrying-wheel (not shown) for the implement is journaled in the open space between the bars A A of the main frame, and D D are the guiding handle-bars of the implement.

Journaled in the beam $b$, at the rear, at one end, and in the bracket $h$ between the handle-bars at its central point, is the rod or shaft $k$. Secured to the upper end of this rod is the shifting-lever $l$, provided with a lug or tongue $m$, which takes into the notches in the segment-rack $n$, the shifting-lever being held in the notches by the spring $r$, acting between the top of the lever and the curved lug $s$ on the upper end of the rod $k$. Secured to the lower portion of the shaft $k$ is the bracket $t$, carrying at each end and extending downwardly the swivel-eyes $u$ $u$, pivoted thereto and held up by cotter-pins. Through these swivel-eyes the rods E E pass, while the other ends of these rods E E are hooked or coupled to the plates $y$ secured to the side wings B, the rods being held from displacement at each end by cotter-pins. $a'$ $a'$ are collars adjustable along these rods E E and held at any desired position by the set-screws $b'$. Encircling the rods and bearing between these collars $a'$ and the swivel-eyes $u$ are the coiled springs F F. To adjust the side wings at any desired position, the operator shifts the hand-lever $l$, thus turning the bracket $t$ and under pressure of the spring F throwing out the side wings B B. Should either of the hoes attached to the side wings meet with an obstruction, the side wing can swing in against the pressure of the spring F, the rod E sliding in the swivel-eye $u$. Instead of hooking one end of the rods to the side wings and allowing the other ends to slide through the swivels secured to the bracket $t$ this method of attachment can be reversed, as will be readily understood, without departing from the spirit of my invention.

Lugs with eyes can be formed on the plates $y$, through which the connecting-rods E E may slide, and the other ends of the rods can be hooked or otherwise secured to the ends of the bracket $t$. With the means above described for regulating the tension of the coiled springs by adjusting the collars $a'$ the spring-pressure can always be retained of the required strength. This is a matter of considerable importance, as otherwise the springs soon lose their strength and the side wings are not held at the proper point of adjustment. Then again with my construction should the user of the implement desire to fix rigidly either or both of the side wings all that he need do is to place the collar $a'$ on the other end of the rod against the swivel and the rod will be held rigidly between the cotter-pin and the collar.

Having thus described my invention, what I claim, and desire to secure by Letters Patent, is—

1. In a grain drill, the combination, with adjustable side wings, lever for adjusting same, and swivel eyes connected therewith, of rods attached to said wings at one end and passing through said swivels at the other, with springs acting between said wings and swivels to allow shifting of said wings against said spring pressure, substantially as shown and described.

2. In a grain drill, the combination, with adjustable side wings, lever for adjusting same, and swivel eyes connected therewith, of rods attached to said wings at one end and passing through said swivel eyes at the other, collars adjustable on said rods, with springs acting between said collars and said swivel eyes, whereby the pressure of said spring may be regulated to permit the desired shifting of said side wings against said spring pressure, substantially as shown and described.

3. In a grain drill, the combination, with adjustable side wings, lever for adjusting same, with upright shaft, and bracket in connection therewith, and said bracket carrying swivel eyes, of rods attached to said side wings at one end and passing through said swivel eyes at the other, collars adjustable on said rods, and set screws for holding same, with coiled spring acting between said collars and said swivel eyes, whereby the pressure of said springs may be regulated to permit the desired shifting of said wings, substantially as shown and described.

HENRY C. HAM.

Witnesses:
J. H. DAVIS,
HERBERT DARR.